April 16, 1935.  R. C. F. KURTZE  1,998,139
APPARATUS FOR ELECTRICALLY WELDING TUBING
Filed June 25, 1931  4 Sheets-Sheet 1

WITNESSES
A B Wallace
J Howard Flint

INVENTOR
Reimar C. F. Kurtze
By Brown + Critchlow
his Attorney

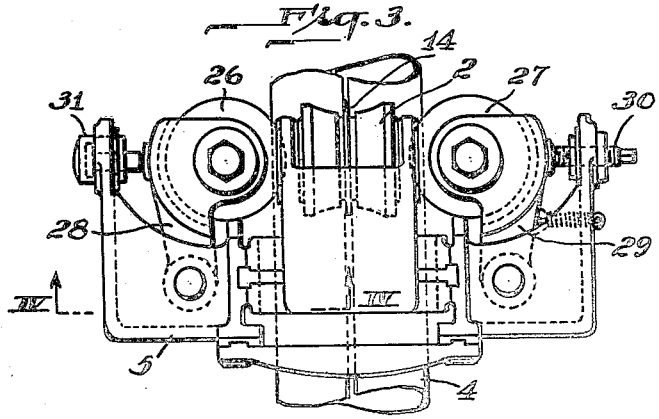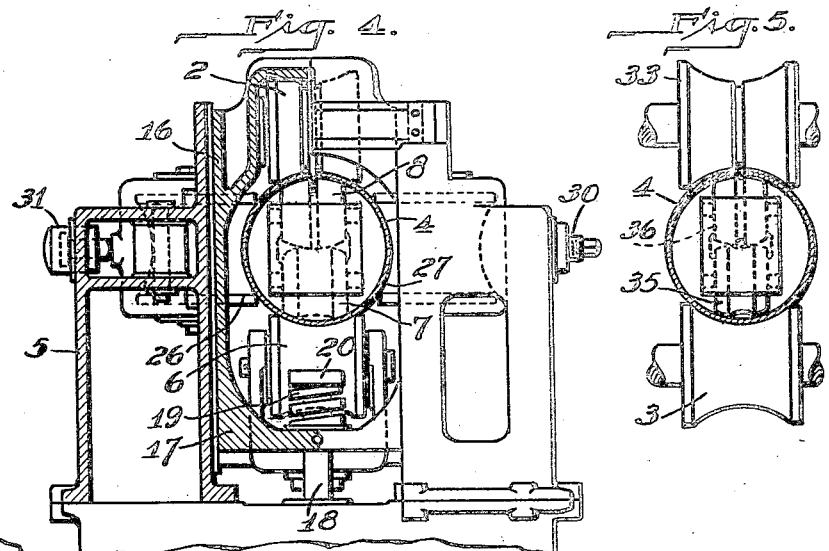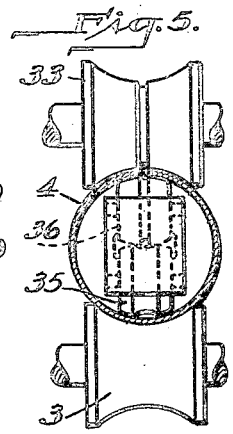

April 16, 1935. R. C. F. KURTZE 1,998,139
APPARATUS FOR ELECTRICALLY WELDING TUBING
Filed June 25, 1931 4 Sheets-Sheet 4
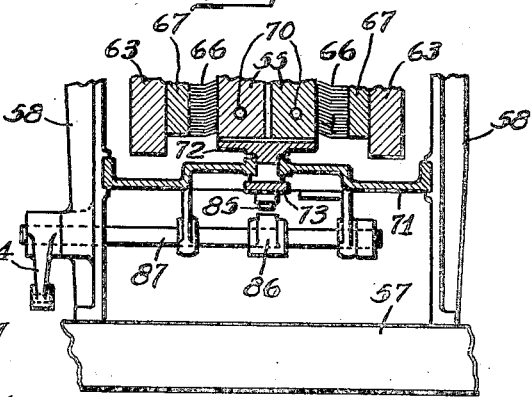
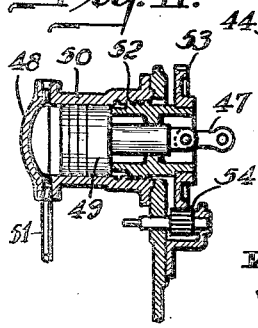
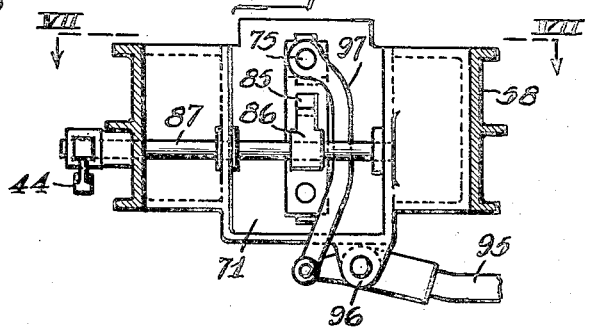
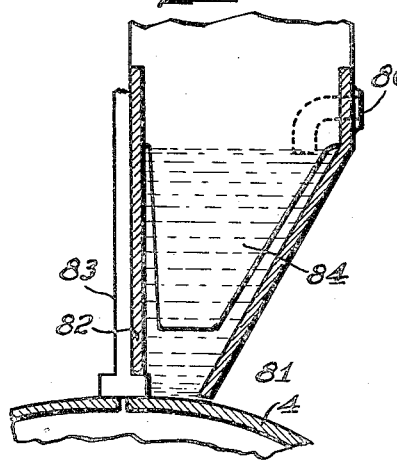
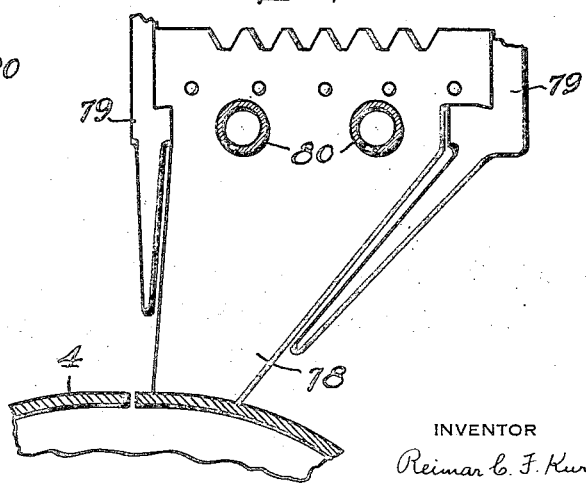
INVENTOR
Reimar C. F. Kurtze
By Brown & Critchlow
his Attorneys.
WITNESSES
A B Wallace
Howard Flint Patented Apr. 16, 1935

1,998,139

UNITED STATES PATENT OFFICE 1,998,139

APPARATUS FOR ELECTRICALLY WELDING TUBING

Reimar C. F. Kurtze, Youngstown, Ohio; Arthur Morgan, administrator of said Reimar C. F. Kurtze, deceased, assignor to Republic Steel Corporation, Youngstown, Ohio, a corporation of New Jersey Application June 25, 1931, Serial No. 546,695

8 Claims. (Cl. 219—6)

This invention relates to the manufacture of metal tubes by electric resistance welding, and particularly to improvements in process and apparatus for progressive resistance welding of longitudinal tubing seams.

In such tubing manufacture, a metal blank is bent lengthwise, progressively or otherwise, so that the edges converge to form a seam, and electric current is applied across the seam to heat the edges sufficiently for suitable pressure to effect welding. In general, as heretofore made, the resultant tube is developed slowly, or its seam weld lacks desired uniformity of metal structure.

These defects in welding tubing originate largely in the high electrical resistances that are encountered between each seam edge and the electrodes applied to the tubing blank. In part, undesirable heating from such resistance is a result of failure to restrain the flow of electric current between electrodes to a direct path across the seam. Considerable current flows lengthwise of the seam, because the point where the meeting edges first contact with each other fluctuates with surface irregularities of the blank. But in even greater part, undesirable heating arises from failure to overcome the high resistance of films, of the nature of oxide scale, that constitute the surfaces of contact between tubing and electrode.

From the heating attendant on these resistances, not only are the electrodes impaired by oxidation, and oxide film on the tubing increased along the tubing seam, but, in the body of tubing adjoining the seam edges, electrical resistance and accumulation of heat are increased until the metal softens and even burns. As a result, careful regulation of heat and pressure has been necessary to avoid buckling or sloughing of metal near the seam and consequent weaking or wastage of tubing.

Objects of this invention are to improve electric resistance welding of tubing so as to obtain seam welds that are uniform in metal structure; to attain high welding speed; to reduce the nicety of control heretofore required, and to minimize wastage of tubing.

Further objects are to provide an improved type of elongate, wiping-electrode apparatus for the progressive welding of moving tubular blank, and auxiliary means for bringing the edges of the blank progressively into mutual contact and for maintaining the initial meeting point of the edges constantly under the forward end of the electrode.

A particularly important object is to provide freely-flowing conducting fluid as a surface of contact between tubing and electrode to reduce their interfacial resistance.

I have discovered that a strongly welded seam of uniform metal structure can be produced rapidly while converging the edges of metal tubing into contact with each other progressively to form a longitudinal seam, by conducting alternating welding current directly across the contacting edges and in a zone that extends along the seam from the point of initial contact of the edges, and by localizing the generation of heat substantially at the edges of the seam. The effect is first to weld the edges together uniformly and then to normalize the weld structure. According to this invention, this is accomplished by contacting a pair of stationary, elongate wiping-electrodes along the seam of a moving tubular blank while causing liquid to flow down freely over interior surfaces of the electrodes and directly into the interface of their contact with the blank. At the same time, welding pressure against the sides of the blank is applied yieldingly to overcome surface irregularities of the blank as the moving edges converge into contact, and thus to maintain the point of meeting of the edges in a constant position under the forward end of the electrodes. In this way the actual edges are heated instantly as they meet and are welded during the first extent of seam travel through the zone of electric current.

In the accompanying drawings, illustrating the preferred embodiment of this invention:

Fig. 3 is a plan view of a group of guide rolls including a seam-guiding roll and lateral rolls located near the tubing entrance to the electrodes;

Fig. 4 is an end assembly view of guiding and supporting rolls at the tubing entrance to the electrodes, with the frame partly in vertical cross section, along line IV—IV of Figs. 1 and 3;

Fig. 5 is an end assembly view from the tubing discharge end of the machine, from plane V—V of Fig. 1 showing a group of guiding and finishing rolls;

Fig. 6 is a schematic plan view along tubing being welded, showing the relations between electrodes, tubing seam, and guide rolls;

Fig. 7 is a horizontal cross section, along the line VII—VII of Figs. 1 and 8, showing details of the upper part of an electrode pair and their attachment to a guiding frame and to transformer terminals;

Fig. 8 is a side elevation along the vertical plane VIII—VIII of Fig. 1, showing details of an attachment for auxiliary vertical adjustment of the electrodes;

Fig. 9 is an end elevation of one of the electrode terminals;

Fig. 10 is a vertical cross section through a modified form of terminal; and

Fig. 11 is a vertical section in detail of hydraulic pressure means for controlling lateral pressure rolls such as weld-sizing rolls at the electrode zone.

Figure 1:
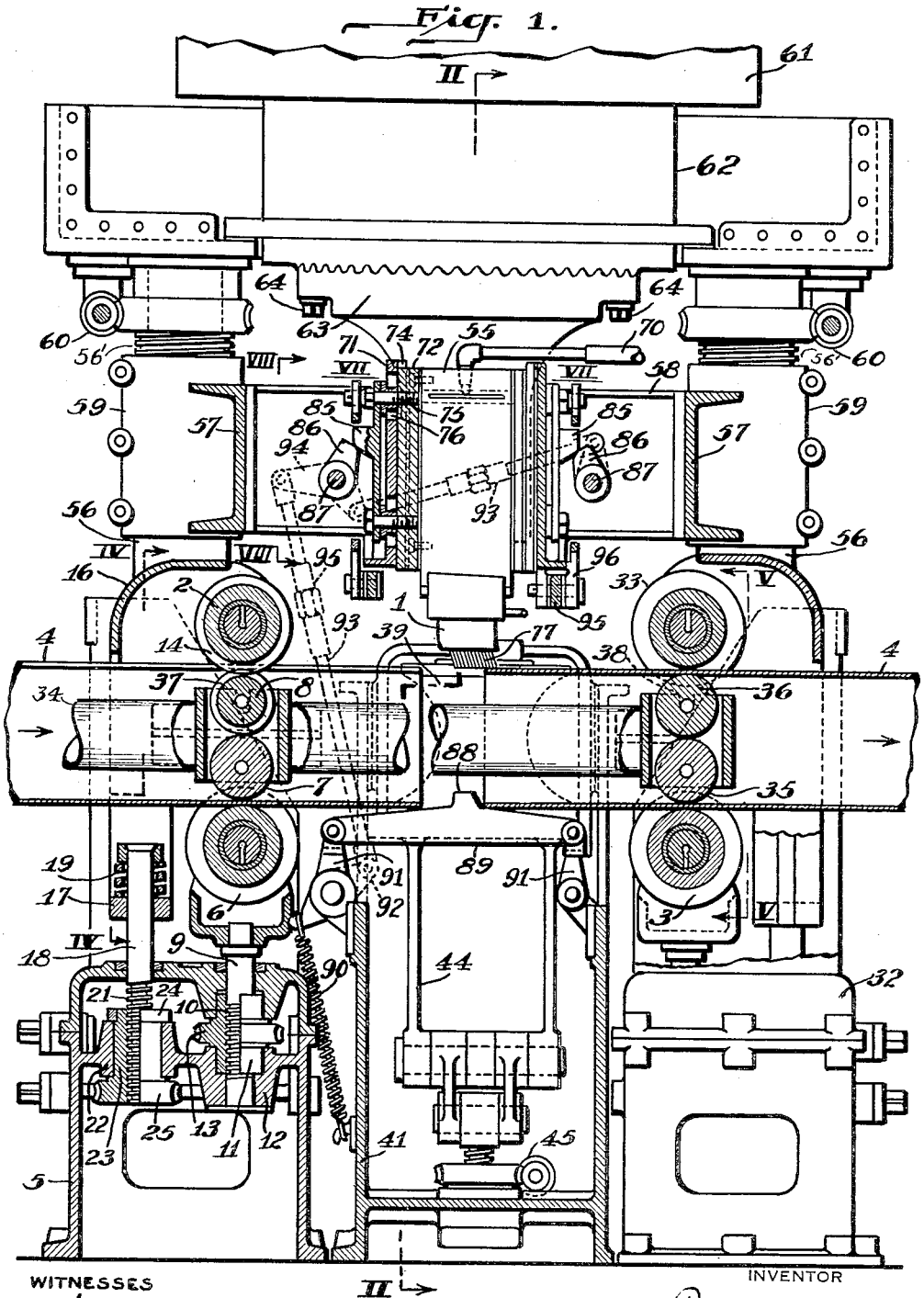
Fig. 1 is a longitudinal vertical section through an assembled welding machine.
Figure 2:
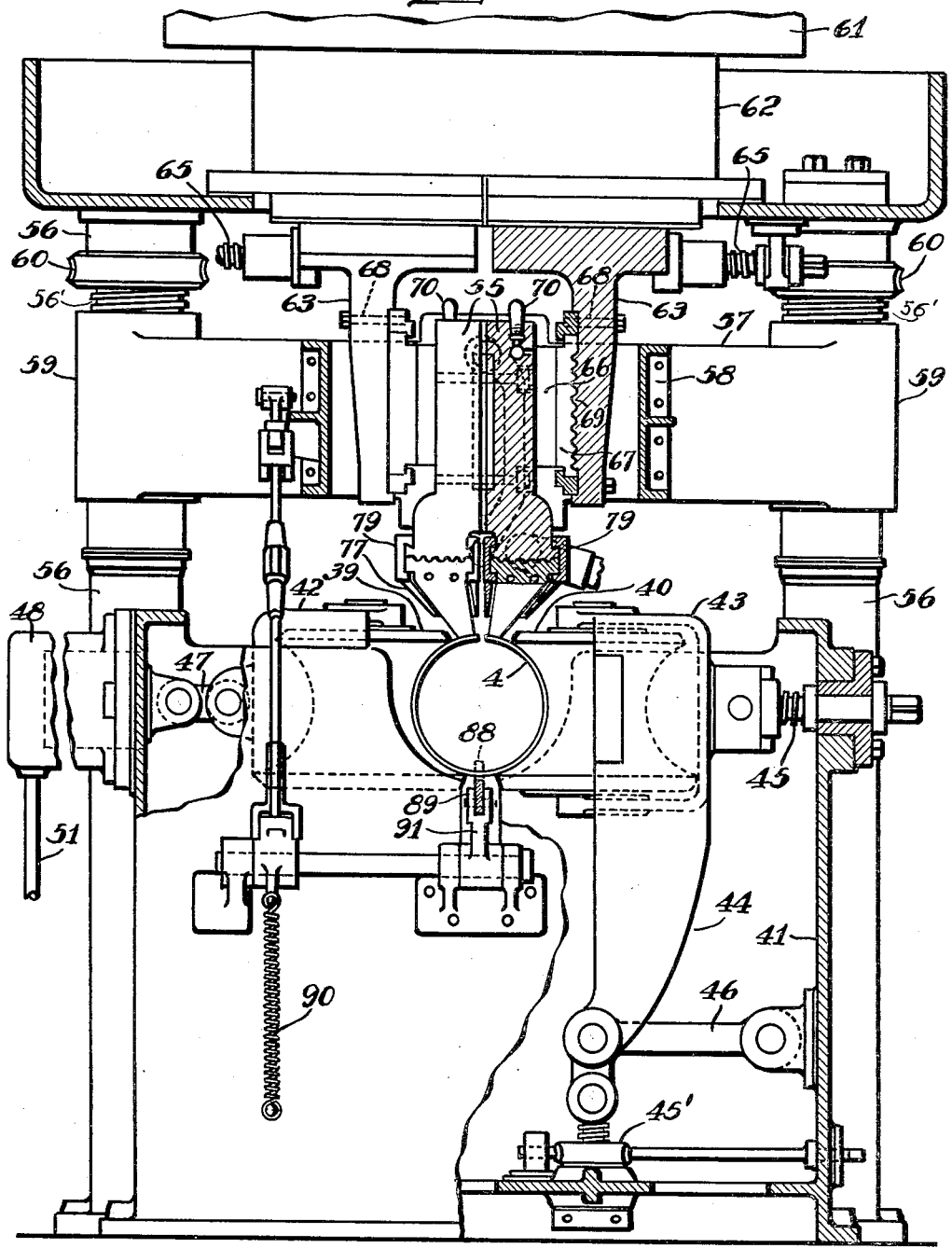
Fig. 2 is an end assembly view of the machine, partly in vertical cross section along broken line II—II of Fig. 1, a portion of one electrode being shown in section, and a supporting frame being partly broken away.

Referring more particularly to the drawings, Figs. 1 and 2 show a welding machine containing a pair of stationary, elongate electrodes 1. These are located between a group of seam guiding rolls that includes upper finned guide roll 2, and a group of discharge rolls that includes supporting roll 3. The pair of electrodes is adapted, through means later to be described, to ride freely on the moving tubing 4 being welded.

The group of seam-guiding rolls that contains finned roll 2 is supported by a stationary frame 5. As shown in Figs. 1 and 4, this group includes a lower tube-supporting roll 6, upon which the upper guiding roll 2 is carried through a vertically disposed pair of intermediate rolls 7 and 8. Lower roll 6 is mounted upon a vertically adjustable supporting column 9, which is provided with a screw thread 10 to engage interior threads of a rotatable sleeve 11. Sleeve 11 is supported by a vertical bearing 12 mounted in frame 5 and is provided with a worm gear 13 for rotation to adjust the supporting roll 6 and with it the vertical series of rolls 7, 8 and 2.

Upper guide roll 2 of this group, carrying a fin 14 to ride between the converging edges 15 of blank 4, has bearing connections at its sides for suspending guide arms 16. These vertical arms 16 have a common lower end 17 which surrounds a vertical adjusting column 18, and arms 16 are held down yieldingly by column 18 through a spring 19 interposed between their end 17 and the enlarged top 20 of column 18. Thus roll 2 is drawn down against the tubing seam but yields with surface irregularities of the moving blank and absorbs the shock of incoming sections. The adjusting column 18 is provided with a screw thread 21 and is mounted in a bearing 22 through an intermediate, internally-threaded sleeve 23 having an upper supporting collar 24. Sleeve 23 is rotated by a worm gear 25 to raise or lower column 18 for vertical adjustment of roll 2.

This group of guide rolls also contains arcuate rolls 26 and 27, disposed against the sides of tubing blank 4 between lower supporting roll 6 and upper finned roll 2, as shown in Figs. 3 and 4. These lateral rolls 26 and 27 are supported by frame 5 through horizontally-extending pivoted bearing-stirrup arms 28 and 29, respectively. For adjusting the throat between these side rolls to accommodate tubing of different diameters, a screw 30 extends through the side of frame 5 and bears against stirrup arm 29, and an hydraulic piston 31 bears against stirrup arm 28 to provide yielding lateral pressure.

Adjustably mounted on a frame 32 at the tube exit end of the machine, there are vertically-disposed upper and lower exterior rolls 33 and 3 respectively, of arcuate contour for guiding and supporting the welded tubing, as shown in Figs. 1 and 5. No vertical play is necessary for upper roll 33, nor are any side rolls necessary at this discharge end, but rolls 33 and 3 are adjustable vertically, similarly to guide rolls 2 and 6, for accommodating tubing of different sizes.

An arm 34 extends into the pipe, as shown in Fig. 1, for supporting pairs of inner rolls 7, 8 and 35, 36 in opposed relation, respectively, to the vertically aligned guide rolls 6, 2 and discharge rolls 3, 33. It is characteristic of these inner rolls that the upper inner rolls 8 and 36 are confined in vertical open guides 37 and 38, respectively, rather than in closed bearings, and that they ride in a groove formed in the lower rolls 7 and 35. Thus, these inner rolls contact with each other over a considerable surface so that wearing of the roll faces under high pressure is minimized. Also, with the open guides, deterioration of inner bearings is avoided, rapid replacement of the upper rolls is facilitated in adjustment to tubes of different sizes, and the rolls accommodate themselves to irregularities along the tubing seam.

As shown in Fig. 5, the upper discharge rolls 33 and 36 that press against the seam area are grooved centrally to arch over the seam itself. Thus, the function of the finishing rolls is not to smooth the seam itself, but to complete an arcuate contour of the metal along the seam. This is desirable, since, in bending a metal blank to tubing form, it is difficult to apply pressure adequately to leave the metal curved along the extreme edge portions, and therefore in practice the metal across the seam of the tubing blank is flat rather than arcuate (Figs. 9, 10). An advantage of particular importance, resulting from the groove of outer roll 33 and the wide face of upper inner roll 36 lies not only in bringing the flat area of the finished seam to arcuate contour, but more particularly in spreading the weld proper upwardly and outwardly. Heretofore it has been the practice to flatten or roll down any burr existing at the weld; but inasmuch as the hot metal of the new weld carries a surface film of oxide, such smoothing of the weld has effected a folding-in of oxide toward the middle of the burr and developed an incipient hair-line crack of relatively weak structure. With the present invention, however, any oxide is pushed up and out from the body of the weld, smoothing of the seam being accomplished later by cutting off the burr.

In the electrode zone there are weld-sizing pressure rolls 39 and 40 disposed at the sides of tubing 4, as shown in Figs. 2 and 6. At least one of these is mounted yieldingly, to bring the point of initial contact of the converging tubing edges under the forward end of the electrodes, and to maintain it there by constant pressure against the closing seam. Necessity for this resilient mounting arises from irregularities that are usually encountered on the surfaces of metal blank; for it is important to keep the electric current from straying along the converging edges before welding, as it does if the meeting point of the edges fluctuates materially.

These lateral weld-sizing rolls are mounted on vertical axes in a frame 41 by bearing stirrups 42 and 43 that are adjustable to or from each other to regulate the size of the electrode throat. Stirrup 43 is mounted on vertical arms 44 pivotally supported at their lower ends and is adjustable laterally by a screw 45 rotatably mounted in frame 41. The pivoted vertical arms 44 supportion bearing-stirrup 43 are adjustable vertically by a worm and screw mechanism 45' shown in Fig. 2 and its lower end is held against lateral movements by a link 46 pivotally mounted on the frame 41. The opposing stirrup 42 is adjusted toward the tubing through a link 47 attached to it and to the piston of a yieldable pressure means 48 mounted on side frame 41. As shown in Fig. 11, such yieldable pressure means 48 comprises a hydraulic piston 49 mounted in a horizontal cylinder 50, for actuating link 47. High pressure fluid is introduced back of the piston through an inlet 51, the piston being limited in its movement toward the tubing by an adjustable stop 52 that is threaded into cylinder 50 and adjusted therein by rotation through a gear 53 and a pinion 54.

Referring to the electrode assembly, Figs. 1 and 2 show wiping-electrodes 1 having upper blocks 55 mounted between two pairs of columns 56 having rotatable, externally threaded sleeves 56' and upon frame members 57 and 58. To accommodate tubing of different diameters, the electrodes are adjustable vertically by raising or lowering frame 57 which is provided with internally threaded sleeves 59 engaging rotatable sleeves 56'. To raise or lower sleeves 59 the columns are rotated by appropriate worm gear 60. Above the electrodes, a stationary transformer 61 is supported on columns 56.

At the bottom of the transformer, copper blocks 62 are secured as secondary terminals, and plates 63 of heavy conducting material are suspended from these by bolts 64 for electrical connection with the sides of electrode blocks 55. The inter-engaging faces of the secondary blocks and connector plates contain corrugations extending toward the electrodes, not only for providing extensive electrical contact but also for guiding the plates as they are moved laterally in adjustment of their pressure against the sides of the electrodes. This adjustment is by screw 65, mounted from columns 56.

The two suspended connector plates 63 make electrical contact with the sides of upper electrode blocks 55 through laminated terminals, as shown in Figs. 2 and 7. Each of these laminated terminals comprises vertically disposed conducting sheets 66 secured at their edges to the plate 63 through an intermediate conducting block 67. This connecting block 67 is fastened to the suspended plates 63 by bolts 68, the inter-engaging faces of the plate and the block being corrugated horizontally as shown at 69. Thus, between the electrodes and the free edges of the secondary terminal laminations there is sliding contact, as the electrodes ride up and down freely on a moving tubing being welded. To improve the electrical contact between the electrode blocks 55 and these secondary terminal sheets 66, each electrode block is provided with a conduit 70 for a stream of a conducting and cooling liquid to flow over the common surfaces of the electrode blocks and secondary terminal laminations, as shown in Figs. 1 and 2.

The engagement between electrodes 1 and secondary connectors 66 and with supporting frame 57 is shown in horizontal cross sectional view in Fig. 7. Frame member 57, extending between a pair of the columns 56, supports a cross frame 58, which in turn supports an inner frame 71 parallel with main frame 57. Vertical movement of the electrodes is guided and limited by this inner frame 71. For this purpose, the upper electrode blocks 55 are bound together as a mechanical unit by plates 72, bolted as shown also in Fig. 1, and extending across the ends of each block. The electrode blocks are suitably insulated from each other and from the cross plate, and cross plates 72 and inner frames 71 are of material such as brass to minimize energy losses. The electrodes are guided in frame 71 by a tongue 73 of the cross plate 71, which tongue extends into a corresponding groove 74 of the frame, and they are limited in their extremes of vertical movement by heavy bolts 75 (Fig. 1) that extend from cross plate 72 between slots 76 in the solid outer portions of frame 71.

The electrodes 1 generally are of rigid open construction, elongated in the direction of travel of a tube, as shown in Figs. 1 and 6. They are provided with terminals 77 having arcuate ends adapted to fit the tubing being welded. These terminals comprise separate spaced laminations 78 shown in Fig. 9, of conducting heavy plate material, for example of ¼ inch copper, the laminations extending at an angle to the pipe seam. At their tops they are riveted together with intervening spacers, and as a whole are removably mounted on the upper solid electrode blocks 55, the meeting faces being provided with corrugated surfaces that are locked together by sliding clamps 79, Figs. 2 and 9. These plates are stiff enough to keep their lower ends openly spaced from each other even while pressure is applied to the moving tubing by the electrodes.

Through the upper portion of each terminal 77 there extend one or more conduits 80 (Fig. 9) for providing liquid to flow down over the several interior surfaces of the electrode and upon the contacting faces of the electrode terminal and tubing. In Fig. 10 there is shown an alternative form of terminal constructed like a trough, and adapted to be kept filled with liquid, the lower end of the trough being open. The outer edges 81 of the trough press directly against the tubing so that liquid flows from the trough under this edge upon the tubing 4. The inner edge 82 is kept liquid-tight by an insulating spacer 83, which extends in liquid-excluding contact over the seam being welded, and upwardly between the electrodes to insulate them from each other. To decrease the internal resistance of this form of electrode, its laminated sheet terminals 84 dip into the body of the liquid.

The welding apparatus includes means for locking the electrodes in welding position against dropping between successive and separated tubing sections. As shown in Fig. 1 this means includes lugs 85, secured to bolts 75 in the side of each electrode block 55, and latches 86 that are rocked by shafts 87 into and out of engagement under lugs 85 by intermediate connections with a tube-actuated trip 88. The trip 88 is a lug under the electrodes that projects from a bar 89 mounted with a spring 90 at one end on rocker arms 91. Thus, as separate sections leave their welding position, spring 90 is permitted to draw lug 88 into the path of tubing travel. As separate sections enter their welding position they slide against trip 88 and force it out of their path. The swinging bar 89 is connected at one end through a bell crank lever 92 with adjustable pitmen 93, which in turn are connected through other levers 94 and shafts 87 to oscillate the latches 86. Thus, latches 86 are mounted to be withdrawn from support of the electrode by the weight of tubing in welding position, so the electrode may ride freely on the tubing during welding, and are adapted to be inserted for locking the electrodes in welding position just before the ends of separate sections of tubing leave the electrode zone.

To enable an operator to elevate the electrodes momentarily, a lever 95 is mounted on brackets 96 (Fig. 8) suspended from cross frame 71 to raise electrode blocks 55 through links 97 and bolts 75.

In operation, the edges 15 of a tubing blank 4 are brought by finned guide roll 2 to face each other, and then by the lateral pressure rolls 39 and 40 are made to converge progressively so that their point of initial contact with each other occurs at the forward end of the electrode zone. No electric current flows along the edges nor between them until they meet. Then current flows directly across their meeting point so that welding heat is attained quickly during the initial travel of the tubing seam through the electrodes, since the electrical resistance is least where the cool edges first unite. Welding occurs for a distance along the seam, for example of ¼ to ¾ inch. As the tube progresses through the electrode zone, the continued flow of current, though decreased because of the high temperature of the metal at and adjacent to the seam, heat treats or normalizes the metal structure of the seam to obtain a strong and durable weld. This occurs in the seam along a distance, for example, of five or six inches. Lateral pressure for knitting the seam during welding results from the stresses obtained as the tubing edges are directed from tube-guiding rolls 2, 26, 27 to tube-sizing rolls 39, 40 applied respectively ahead of the electrodes and nearly opposite their tube-discharge end. During the welding and heat treating, the arcuate shape and the stiffness of the elongate electrode terminals contribute to maintaining the seam edges in accurate contact. With this arrangement, taken with the operation of the electrode latch, tubing is welded even to the end of a section without wastage.

Flow of heavy current and localization of heat at the seam are facilitated by the decrease of different electrical resistances back from the seam. Thus, cooling the electrodes, by bathing the extensive interior surfaces of their laminated structure with the freely flowing liquid, reduces the internal resistance of the electrodes; while electrical contact resistance is lowered by the flowing of conducting liquid down from the laminated terminals into the interface between electrode and tubing. The conductivity of ordinary water for this purpose preferably is increased by dissolving any suitable salt, for example magnesium sulfate, the conductivities of various salt solutions being well known of themselves. Though the friction of advancing tubing under these elongate wiping-electrodes is low, because of the lubricating effect of the liquid contact film, there is sufficient abrasion to cleanse the metal surfaces between the tubing and electrode, and to keep the electrical contact resistance low. Further, cooling the metal of the tubing serves to lower its electrical resistance so that the electric current flows to the seam with relatively little generation of heat.

While the introduction of current to the seam itself without excessive heating of the metal back from the weld, yields advantages from an avoidance of "hot spots" or burnt metal, and avoidance of soft metal under the electrode, a result of paramount importance is reduction of the pressure applied to a seam being welded. With interfering resistances minimized and with a large electrode area, relatively low pressure is adequate for introducing a given amount of current, in comparison for example with the pressure necessary with a roller electrode and high interfering resistances. Consequently, with the metal adjoining the seam at lower temperature and under lower unit pressure, accurate regulation of pressure is substantially eliminated. This feature is very important, for it permits even large diameter thin-wall tubing to be welded rapidly without distorting or burning the seam. With this invention, usually sufficient contact pressure is obtained by simply supporting the entire electrode weight upon the metal along the seam during welding; a constant weight of, for example, about a thousand pounds being sufficient.

By way of example of the practice of this invention but without limitation, tubing of 0.31 to 0.37 inch gage is obtained at a welding speed of 60 feet per minute, with the voltage appropriately about 3.5 and the current across the weld 80,000 to 100,000 amperes. For welding speed of 150 to 180 feet per minute this amperage is about 200,000 to 250,000 at about 5.5 volts. This current is applied through an area of each electrode of approximately 8 square inches for the smaller tubing, to 12 or 15 square inches for tubes of 10 to 30 inches diameter. For the smaller diameter of tubing, the amount of current varies downwardly to 30,000 to 60,000 amperes at 3.5 to 5 volts, with welding speeds of 120 to 150 feet per minute, and tubing of 0.125 to 0.188 inch gage. For very thin wall tubing, as 0.025 inch, and welding speeds of 150 to 200 feet per minute, the voltage is kept low, for example 1.5 volts, and the current at about 30,000 amperes.

By this invention heavy walled tubes are welded as well as those of thin wall, and large diameter tubes whether thick wall or thin as well as small diameter tubing, using the terms "tubes" and "tubing" in a broad sense.

It will be understood that in this specification and claims the term "longitudinal" includes helical seams as well as those extending in one plane along the pipe being formed.

According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim:

1. In electric tube-welding apparatus, a pair of stationary elongate wiping-electrodes having rigid terminals disposed for extensive contact along opposite edges of a longitudinal seam of moving tubular blank to apply a zone of current across the seam, said electrode terminals having interior surfaces opening at the contact interface between terminal and blank, and means within the electrode to provide a flow of cooling liquid down over the interior surfaces and out at the terminal contact.

2. In electric tube-welding apparatus, a pair of stationary laminated wiping-electrodes each comprising spaced vertical stiff cross sheets of conducting material connected as a whole for extensive longitudinal contact with the seam to be welded, and having arcuate ends individually disposed at an angle to the seam to apply a zone of current for progressively welding and heat treating the seam.

3. In electric tube-welding apparatus, a pair of stationary elongate wiping electrodes, comprising spaced vertically disposed stiff sheets of conducting material connected as a whole to fit in extensive contact along a longitudinal seam of moving tubular blank to apply a zone of current for progressively welding and heat-treating the seam, and conduits within each electrode to provide a flow of liquid down over the surfaces of the conducting sheets into contact with the moving blank along the seam, said electrodes being disposed to contact with the blank on opposite sides of the seam.

4. Electric tube-welding apparatus, comprising a pair of stationary elongate wiping-electrodes having laminated terminals of spaced stiff conductors, said electrodes being supported to fit in extensive contact with opposite sides of a longitudinal seam of moving tubular blank to apply a zone of current across the seam, transformer leads having rubbing contact with the sides of said electrodes, and means within the electrodes to provide a flow of liquid over the contact surfaces between electrode and transformer lead and between terminal conductor and moving blank.

5. In a tube-welding apparatus, a pair of electrodes each composed of a plurality of vertically disposed stiff sheets of metal of good electrical conductivity connected in spaced relation to form an elongate laminated electrode structure, the tube-contacting bottom faces of said sheets being contoured to fit the periphery of the tube, said electrodes being supported in fixed position to contact with opposite sides of the seam of a tubing blank passed through the apparatus, means associated with the electrodes to provide a film of electrically conducting liquid between the electrodes and the blank, transformer leads supported to have relatively movable contact with the electrodes, means acting upon said blank to close the seam substantially at its point of initial contact with the electrodes, and vertically movable means carrying said electrodes to be supported by the blank for free vertical movement relative to said leads in response to surface irregularities of the blank under the electrodes.

6. A tube-welding apparatus, comprising an electrode guide frame containing a vertical slot, a stationary elongate pair of wiping-electrodes supported to rest longitudinally upon opposite sides of the seam of a moving tubular blank, each electrode comprising an upper conductor block having a projection adapted to slide in the frame slot, and each electrode carrying a removable laminated terminal of spaced, stiff conducting sheets adapted to be locked to the electrode block and having arcuate ends disposed at an angle to the tubular blank, and conduits associated with said electrodes and a supply of electrically conducting liquid to supply liquid to flow down over the interior surfaces of the laminated terminals to form a film of said liquid between the terminals and the blank.

7. A tube-welding apparatus, comprising a stationary elongate pair of wiping electrodes supported by tubular blanks passed through the apparatus, a pair of weld-sizing rolls positioned near the tube exit end of the electrodes and mounted resiliently to apply pressure at the sizing throat yieldingly to overcome surface irregularities of the tubing blank, and a group of guide rolls positioned at the forward end of the electrodes and mounted resiliently to apply pressure yieldingly on incoming tubular blank to overcome irregularities of the blank and cooperating with said sizing rolls to bring the seam edges of the blank into initial contact substantially at the forward end of the electrodes.

8. A tube-welding apparatus, comprising a stationary elongate pair of wiping-electrodes supported to rest on moving tubular blank, pairs of lateral pressure rolls mounted resiliently to apply pressure yieldingly against the tubing at the tube exit end of the electrodes and in advance of the forward end of the electrodes for causing the tubing edges to converge, and an arcuate finned roll mounted resiliently above the converging edges to press upon them yieldingly for guiding the seam and for cooperating with said lateral rolls to maintain a meeting point of the converging edges constantly at the forward end of the electrodes.

REIMAR C. F. KURTZE.